(12) United States Patent
Yamamoto

(10) Patent No.: US 6,623,771 B2
(45) Date of Patent: *Sep. 23, 2003

(54) LIVESTOCK FEED COMPOSITION AND ITS PRODUCTION METHOD

(75) Inventor: Masahiro Yamamoto, #1103 Seaside Mansion, 26-1 Kamoike-shinmachi, Kagoshima-shi, Kagoshima-ken (JP)

(73) Assignees: Masahiro Yamamoto, Kagoshima-ken (JP); Noriko Yamamoto, Kagoshima-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/906,909

(22) Filed: Jul. 17, 2001

(65) Prior Publication Data

US 2002/0054935 A1 May 9, 2002

(30) Foreign Application Priority Data

Aug. 29, 2000 (JP) .......................................... 2000-259985
Jul. 18, 2000 (JP) .......................................... 2000-218113

(51) Int. Cl.$^7$ ............................. A23K 1/14; A23K 1/00; A23K 1/06; A23K 1/08; A23K 1/10
(52) U.S. Cl. ........................... 426/53; 426/54; 426/635; 426/805; 426/807
(58) Field of Search ........................... 426/53, 54, 635, 426/805, 807

(56) References Cited

U.S. PATENT DOCUMENTS

| | | | |
|---|---|---|---|
| 3,272,633 A | 9/1966 | Clickner | 99/9 |
| 5,707,856 A | 1/1998 | Higa | 435/262 |
| 5,853,779 A | * 12/1998 | Takebe et al. | 426/20 |

FOREIGN PATENT DOCUMENTS

| | | | |
|---|---|---|---|
| EP | 0 357 320 A2 | | 3/1990 |
| EP | 1 174 041 A1 | | 1/2002 |
| GB | 1 489 592 | | 11/1977 |
| JP | 49-27790 | | 7/1974 |
| JP | 53-69178 | | 6/1975 |
| JP | 53-86377 | | 7/1978 |
| JP | 57-071370 | | 5/1982 |
| JP | 58-190356 | | 11/1983 |
| JP | 60-260489 | | 12/1985 |
| JP | 1-020090 | | 1/1989 |
| JP | 01020090 | * | 1/1989 |
| JP | 06070742 | * | 3/1994 |
| JP | 06078686 | * | 3/1994 |
| JP | 7-075563 | | 3/1995 |
| JP | 07231772 | * | 9/1995 |
| JP | 08-000181 | | 1/1996 |
| WO | WO 00/67588 | | 11/2000 |

\* cited by examiner

Primary Examiner—Chhaya D. Sayala
(74) Attorney, Agent, or Firm—Pearne & Gordon LLP

(57) ABSTRACT

The invention offers a method for producing a livestock feed composition including steps of adding Aspergillus to a feed material comprising at least two types chosen from among a fibrous feed material, a cereal material and an organic waste material, and allowing the Aspergillus to incubate, and a livestock feed composition produced by such a process.

36 Claims, 1 Drawing Sheet

LIVESTOCK FEED COMPOSITION AND ITS PRODUCTION METHOD

CROSS-REFERENCE TO RELATED APPLICATIONS

The present application claims the priority of Japanese Patent Application No.2000-218113 filed Jul. 13, 2000, and Japanese Patent Application No. 2000-259985 filed Aug. 29, 2000 as provided for by the Paris Convention, the disclosures of said applications being incorporated herein by reference.

BACKGROUND OF THE INVENTION

The present invention relates generally to a livestock feed composition, particularly to a feed composition which is suitable for the fattening of livestock such as cattle, goats, sheep, swine and fowl, and more particularly to a livestock feed composition using Aspergillus to increase the nutritional value. Furthermore, the present invention relates to a livestock feed composition which withstands long-term storage and is capable of being produced economically.

Conventionally, maize, soybeans, barley, hay, molasses, beet pulp and wheat bran have been used as feed for fattening livestock. While it is the desire of livestock breeders to achieve the expeditious fattening of livestock, giving the livestock feed that is high in nutritional value for the purpose of fattening them can cause them to develop diarrhea, thereby conversely impeding their development. Therefore, the amount of nutrition which can be supplied, and thus the rate of growth of livestock, has been considered to be limited.

Additionally, one might consider the possibility of fattening livestock while simultaneously reducing the cost of feed by increasing the amount of wheat bran, which is cheap yet has high nutritional value, but wheat bran has a high phosphorus content, and feeding livestock large amounts of wheat bran can cause them to develop ureterolithiasis which can lead to death, so that the amount of wheat bran which may be safely included in feed has been considered to be limited to about 5% of the total amount of feed.

Furthermore, with regard to livestock such as swine and fowl, feeding them large amounts of organic wastes such as swill can lead to yellowing and softening of the fat in the livestock due to the high concentration of fats included therein, thus reducing the quality of the meat.

SUMMARY OF THE INVENTION

The primary object of the present invention is to offer a livestock feed composition which at least partially overcomes the conventional problems described above, and a method for producing such a livestock feed composition.

Another object of the present invention is to offer a livestock feed composition which has a high nutritional value and promotes the fattening of livestock without causing any problems such as ureterolithiasis or diarrhea, and a method for producing such a livestock feed composition.

Another object of the present invention is to offer a livestock feed composition capable of maintaining a low production cost, and a method for producing such a livestock feed composition.

Another object of the present invention is to offer a livestock feed composition suitable for the fattening of ruminant animals, and a method for producing such a livestock feed composition.

Another object of the present invention is to offer a livestock feed composition suitable for the fattening especially of swine or fowl, and a method for producing such a livestock feed composition.

According to a first aspect, the present invention offers a method for producing a livestock feed composition comprising steps of combining Aspergillus with at least two types of feed materials chosen from the group consisting of a fibrous feed material, a cereal material and an organic waste material, and allowing the Aspergillus to incubate to form an Aspergillus-containing livestock feed composition.

In the above, with regard to ruminant animals, the present invention offers a method for producing a livestock feed composition wherein the step of combining comprises adding a cereal material or an organic waste material to a fibrous feed material. The amount of wheat bran capable of being added to feed was limited to 5% or less due to the presence of phosphorus. However, problems do not occur in the livestock feed composition produced by this method, and an economical feed composition is offered.

Additionally, with regard to livestock such as swine and fowl, the present invention offers a method for producing a livestock feed wherein the step of combining comprises adding an organic waste material to a fibrous feed material or a cereal material. Conventionally, feeding livestock feed high in nutritional value can cause livestock to develop diarrhea. However, with the feed composition produced with the present method, it is possible to offer a feed composition high in nutritional value and promoting increases in the weight of the livestock without causing any problems. Additionally, this enables the effective reuse of organic waste which is produced in large quantities and the handling of which is problematic. Furthermore, it is possible to overcome decreases in meat quality by using organic waste materials that are high in oils.

Thus, with the present invention, it is possible to effectively produce a feed composition which is economically produced and high in nutritional value by combining Aspergillus with at least two types of feed materials chosen from the group consisting of a fibrous feed material, a cereal material and an organic waste material, and allowing the Aspergillus to incubate. Here, the Aspergillus may include such varieties as *Asp. oryzae, Asp. awamori* and *Asp. sojae*, which may more specifically be *Asp. oryzae kawachii* and *Asp. awamori kawachii*.

Furthermore, it is possible to add one or a mixture of materials chosen from the group consisting of a fibrous feed material, a cereal material and an organic waste material after incubation of the Aspergillus.

Additionally, as a method for more favorably overcoming the above-described problems, a method is offered of adding Aspergillus to wheat bran and allowing the Aspergillus to incubate to produce Aspergillus-containing wheat bran, then mixing this Aspergillus-containing wheat bran with a cereal material or an organic waste material and allowing to ferment.

Furthermore, a method of producing a livestock feed material further comprising a step of adding one or more common feed materials selected from the group consisting of barley, rice, soybeans, maize, hay, molasses and beet pulp is offered. In this case, the amount of the Aspergillus-containing livestock feed composition should preferably constitute at least 5 wt % and up to 30 wt % of the entire livestock feed composition.

Additionally, the present invention offers a method for producing a livestock feed composition wherein the combining step comprises mixing at least two types of feed materials chosen from the group consisting of a fibrous feed material, a cereal material and an organic waste material having a water content of 50% or less and a starch equivalent of at least 15% or an oil content of at least 5% and heat-sterilizing this mixture to form a culture medium, cooling the culture medium to a temperature compatible with Aspergillus and mixing Aspergillus into the culture medium; and the incubating step comprises maintaining the temperature of the culture medium and the Aspergillus in a constant temperature tank to allow fermentation. With this method and under these conditions, it was observed that it is possible to produce a livestock feed composition which is (1) economical, (2) has high functionality and (3) withstands long-term storage with a water content of 20% or less. In particular, a method of adjusting the water content and starch equivalent or oil content of an organic waste material with a high nutritional value by means of a cereal material or a fibrous feed material is preferable, this method allowing for high-concentration organic waste materials which are treated as garbage on a fee basis, that is, normally requiring treatment such as incineration which costs money, as culture media for the Aspergillus, and the heat of fermentation of the Aspergillus enables a water content of 20% or less to be reached simply by maintaining heat and ventilating with air, thereby to produce a livestock feed composition capable of withstanding long-term storage. If the high-concentration organic waste material has a water content of 50% or less and a starch equivalent of at least 15% or an oil content of at least 5%, the Aspergillus is enabled to proliferate, and the heat of fermentation of the Aspergillus enables the water content to ultimately be reduced to 20% or less by means only of maintaining the temperature or ventilation, thus resulting in a livestock feed composition which is capable of withstanding long-term storage. Additionally, according to another embodiment of the present invention, the high-concentration organic waste material is first steam-sterilized. This is to prevent other micro-organisms from proliferating during the production process.

According to another embodiment of the present invention, after adding the Aspergillus, the temperature is maintained within the range of 35 to 50° C. for at least 24 hours for fermentation while simultaneously reducing the water content to 20 wt % or less.

Furthermore, according to another embodiment of the present invention, an Aspergillus-containing feed composition is mixed with a high-concentration organic waste material. This procedure enables the water content of the feed composition to be readjusted.

According to a second aspect of the present invention, a livestock feed composition comprising an Aspergillus-containing feed composition obtained by combining at least two types chosen from the group consisting of a fibrous feed material, a cereal material and an organic waste with Aspergillus and allowing the Aspergillus to incubate is offered.

In the above, with regard to ruminant animals, a livestock feed composition wherein the Aspergillus-containing feed composition is obtained by adding a cereal material or an organic waste material not containing animal proteins to a fibrous feed material is offered, and with regard to swine and fowl, a livestock feed composition wherein the Aspergillus-containing feed composition is obtained by adding a fibrous feed material or an cereal material to an organic waste material is offered.

Furthermore, it is preferable to add Aspergillus to wheat bran and allow the Aspergillus to incubate to produce an Aspergillus-containing wheat bran, mix the Aspergillus-containing wheat bran with a cereal material or an organic waste material, and to ferment the result.

Furthermore, the present invention offers a livestock feed composition further comprising at least one or more common feed materials chosen from the groups consisting of barley, rice, soybeans, maize, hay, molasses and beet pulp in addition to the above-described Aspergillus-containing feed composition, where the amount of the Aspergillus-containing feed composition preferably constitutes at least 5 wt % and at most 30 wt % of the overall weight of the feed composition.

According to another aspect of the present invention, a livestock feed composition which is capable of withstanding long-term storage is offered, this livestock feed composition being obtained by mixing at least two types of feed materials chosen from the group consisting of a fibrous feed material, a cereal material and an organic waste material having a water content of 50% or less and a starch equivalent of at least 15% or an oil content of at least 5% and heat-sterilizing this mixture to form a culture medium, cooling the culture medium to a temperature compatible with Aspergillus and mixing Aspergillus into the culture medium; and maintaining the temperature of the culture medium and the Aspergillus in a constant temperature tank to allow fermentation until the water content is reduced to 20 wt % or less.

DETAILED DESCRIPTION OF THE INVENTION

Figure 1:
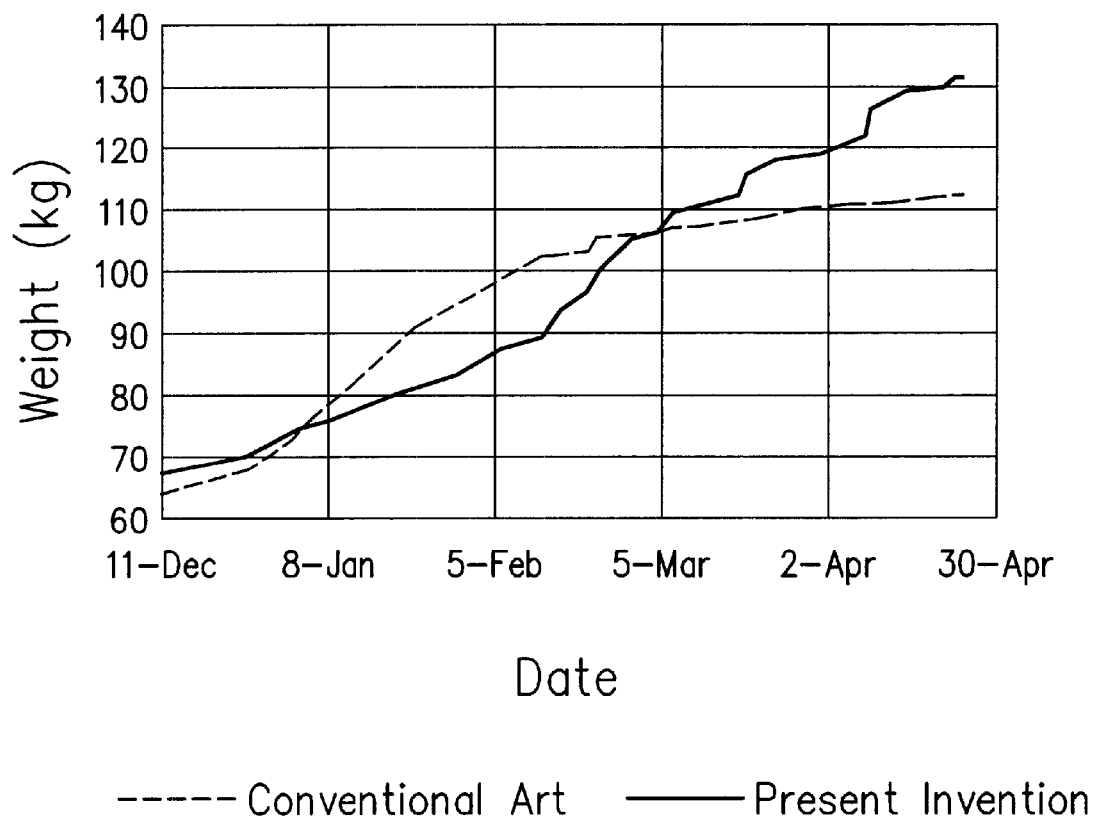
FIG. 1 is a graph showing a comparison of the average weight over a period of five months between swine given standard feeds according to their stage of development, and swine given a feed containing, in addition to the above-described feed, a feed composition according to the present invention comprising a feed composition treated with Aspergillus in an amount of 15% with respect to the total amount of feed, as shall be explained below in Example 4.

Herebelow, a preferred embodiment of the present invention shall be explained.

In the livestock feed composition producing method of the present invention, at least two types of feed composition raw materials chosen from among a fibrous feed material, a cereal material and an organic waste material are mixed together. Examples of such fibrous feed materials are wheat bran, barley bran, rice bran, hay and beet pulp. Examples of cereal materials are rice, barley, milled barley, wheat, oats, rye, soybeans and maize. Examples of organic wastes include those such as are often produced in the food industry, livestock industry, fishing industry or from the household, including fruit pulp residue left after squeezing out the juice, food scraps, molasses, fish dregs and fowl droppings. These raw materials can be selected as appropriate to the practitioner in accordance with various considerations such as the type of livestock which is to be fed, and the availability, cost and nutritional value of the raw materials.

Whereas any two or more of the above types of raw materials may be chosen, ruminant livestock should preferably be given a feed composition that includes at least a fibrous feed material, and swine should preferably be given a feed composition that includes at least an organic waste material. For example, in a feed composition that is optimized for ruminant animals, the raw material should preferably include as an essential ingredient a fibrous feed material in an amount of approximately 10–90%, more preferably 30–70%, and mixed therein a cereal material and/or organic waste material in an amount of 10–90%, more preferably in an amount of 30–70%. On the other hand, a feed composition that is optimized for swine should preferably include as an essential ingredient an organic waste material in an amount of approximately 10–90%, more preferably 30–70%, and mixed therein a fibrous feed material and/or cereal material in an amount of 10–90%, more preferably 30–70%. In this case, the water content should be 50% or less, preferably 25–40%, this being adjustable according to the selection of raw materials, their proportional content and level of dryness. Furthermore, it is preferable for the starch equivalent to be at least 15% or the oil content to be at least 5%. These can be adjusted particularly easily by a combination of rich organic waste materials with a cereal material and/or fibrous feed material.

Additionally, each raw material is pretreated as needed to be able to be used as a feed material. This pretreatment can, for example, be sterilization, which can be performed by high-temperature sterilization, particularly steam sterilization. Steam sterilization is performed at 100° C. for 30 minutes.

Next, after cooling to a temperature allowing for growth of Aspergillus, preferably 30–40° C., the mixture is seeded with Aspergillus (e.g., in a matrix inoculated with Aspergillus spores and dried, or the spores themselves), and well mixed. Examples of Aspergillus include *Asp. oryzae, Asp. awamori*, and *Asp. sojae*, more preferably *Asp. oryzae kawachii* and/or *Asp. awamori kawachii* (both available from Kirishima Kogen Beer KK). The Aspergillus may also be added in the form of a pre-seeded culture, such as a culture grown on wheat bran. The amount of Aspergillus added need not be a lot because they will proliferate during the production process, but it is of course allowable to add a large amount. The amount of Aspergillus added in spore form with respect to the weight of the entire composition should be, for example, 0.01–0.5%, and preferably it is added in an amount of approximately 0.1%, this being an amount which ensures smooth progression of the procedure but is not wasteful.

It is preferable next to cool the composition down to 30–35° C. While this cooling process can be performed by means of any method, it should preferably be performed by air circulation in order also to supply oxygen which aids in the development of the Aspergillus.

Additionally, a mixed feed composition may be produced by adding Aspergillus to one type chosen from among the group consisting of a fibrous feed material, a cereal material and an organic waste material as the raw material in the above-described process, then subsequently adding one or more other raw materials.

A few hours after seeding, the activity of the Aspergillus will generate heat, and the composition temperature will rise.

Thereafter, it is preferable to maintain the heat by means of a constant temperature tank or the like. The preferable temperature range is 35–50° C., this being capable of being achieved by cooling with ventilation or the like.

When the Aspergillus has begun fermenting, the heat of fermentation causes the moisture to evaporate. Therefore, the procedure can be stopped upon reaching the water content which is desirable in the feed composition. Typically, the water content should be 30% or less, more preferably 20% or less. For example, when maintaining the temperature at around 35–45° C., the water content is reduced to 20% or less by maintaining this temperature range for at least 24 hours.

Alternatively, it is possible to add a fibrous feed material, cereal material or preferably an organic waste material with a high water content upon reaching a water content of preferably around 20% or less, then mixing to adjust the water content to approximately 30% to continue fermentation, and repeating this procedure numerous times.

EXAMPLES

Herebelow, the present invention shall be described in further detail by means of examples. The present invention is of course not restricted to these examples.

Example 1

Herebelow, a method for production of a fermented wheat bran is given as a typical example of a base feed composition which can be used in the present invention.

(1) 50 kg of swill were added to 100 kg of wheat bran, and the water content was adjusted to 35%.
(2) The result was sterilized with steam at 100 degrees for 30 minutes.
(3) After cooling to 40 degrees, 100 g of Aspergillus were sprayed thereon.
(4) The result was further air-cooled to 35 degrees.
(5) 6 hours after spraying with Aspergillus, the activity of the Aspergillus generated heat and the temperature of the product gradually rose.
(6) Thereafter, the product was air-cooled to maintain the temperature within the range of 35 to 50 degrees.
(7) 60 hours after addition of the Aspergillus, the water content reached about 20%.
(8) 20 kg of swill were added and the result mixed to adjust the water content to around 30%.
(9) The Aspergillus became active once again, and the water content reached 20% after 24 hours.
(10) Steps 8 and 9 were repeated for about 2 weeks, whereupon the feed composition was completed.

Example 2

Additionally, in order to compare the components of wheat bran and wheat bran treated (fermented) with Aspergillus, a fermented wheat bran was produced with Aspergillus and the components compared with common untreated wheat bran.

TABLE 1

Comparative Analysis of Wheat Bran and Fermented Wheat Bran (all numerical values in wt %)

|  | Normal Wheat Bran | Fermented Wheat Bran |
| --- | --- | --- |
| Crude Protein | 17.7 | 19.5 |
| Crude Fat | 4.7 | 4.7 |
| Soluble Non-nitrates | 61.4 | 57.6 |
| Crude Fiber | 10.5 | 11.2 |
| Crude Ash | 5.7 | 7 |
| ADF | 14.1 | 14.6 |
| NDF | 38.9 | 44 |

Table 2 shows the results of a more detailed analysis.

TABLE 2

Comparison of Content of Wheat Bran and Fermented Wheat Bran
(all numerical values in ppm except where otherwise specified)

|  | Normal Wheat Bran | Fermented Wheat Bran |
| --- | --- | --- |
| Vitamin A retinol | <3 | <3 |
| Vitamin A β-carotene | 6 | 7 |
| Vitamin A provitamin | <10 | <10 |
| Vitamin $B_1$ | 0.52 | 0.51 |
| Vitamin $B_2$ | 0.39 | 0.15 |
| Niacin | 0.8 | 0.8 |
| Total Vitamin C | 2 | 4 |
|  | μg/100 ml | — |
| Aspartic acid | 198.7 | — |
| Threonine | 219.1 | 460 |
| Serine | 160.9 | 550 |
| Glutamic acid | 757.8 | — |
| Proline | 164.2 | — |
| Glycine | 332.9 | 780 |
| Alanine | 994.4 | — |
| Cystine | 3.8 | 250 |
| Valine | 241.6 | 660 |
| Methionine | 23.2 | 180 |
| Isoleucine | 90.9 | 490 |
| Leucine | 442.1 | 870 |
| Tyrosine | 104.2 | 360 |
| Phenylalanine | 31.7 | 560 |
| γ-aminobutyric acid | 54.3 | — |
| Histidine | 45.7 | 400 |
| Ornithine | 1.3 | — |
| Lysine | 211 | 610 |
| Ammonia | — | — |
| Tryptophan | 0 | 200 |
| Arginine | 401.9 | 1000 |

As shown above, fermented wheat bran does not have any major differences from untreated wheat bran aside from the fact that the protein content has increased by about 2%. With regard to amino acids as well, fermented wheat bran has more glutamic acid, but aside therefrom, untreated wheat bran actually has the higher amino acid content. In terms of vitamins, fermented wheat bran simply has twice as much vitamin B2 as does wheat bran.

Example 3

In order to gauge the effectiveness of a livestock feed composition containing a fermented wheat bran as described above, 1,100 heads of cattle were fed a mixture of an energy feed of corn, soybeans, barley, hay, molasses, beet pulp and the like with fermented wheat bran in an amount of 30 wt % overall.

As a result, the following remarkable effects were obtained:
(1) the odor of the manure was reduced;
(2) the number of cattle having diarrhea over the course of a year was zero;
(3) diarrhea did not occur in the most crucial development period of calves born to cows eating this feed composition; and
(4) the time until market delivery was shortened by 2–4 months.

That is, although no considerable differences were seen in the components of wheat bran and fermented wheat bran in the component analysis, there was a marked difference in the effects on the livestock gained by adding fermented wheat bran to the feed composition.

Additionally, 4 heads of cattle were given a feed composition containing fermented wheat bran in an amount of 10% of the overall weight of the feed composition beginning at 12 months from birth, and their development was observed, upon which the bulls were seen to grow by 580 kg in 610 days, a rate of 0.95 kg per day, whereas cattle given normal feed without any fermented wheat bran added grew by 440 kg in 610 days, a rate of 0.72 kg per day.

As is clear from the above results, the provision of a feed composition containing fermented wheat bran results in an increase of at least 30% of the body weight over the conventional feed. That is, when fermented wheat bran is added to the feed composition, the growth of the cattle is also remarkable in comparison to the case where normal untreated wheat bran is used.

These results seem to suggest that the cattle growth effects due to the fermented wheat bran in this case are not brought about by the nutritional value residing in the fermented wheat bran, but rather the digestion promoting effect of enzymes, improved immune response and a growth promoting effect due to an unknown growth factor believed to originate in Aspergillus.

The same effect can be obtained not only from wheat bran, but also using such fibrous feed materials such as barley bran, rice bran, hay and beet pulp, so that an outstanding livestock fattening effect and anti-diarrheal effect can be obtained with feed compositions containing these materials as well. Furthermore, the same effects can be obtained using feed compositions containing cereals such as rice, barley, ground barley, wheat, oats, rye, soybeans and maize, and organic waste such as fruit pulp, food scraps and molasses which have been fermented as described above.

Example 4

A livestock feed composition containing Aspergillus according to the present invention having swill as its main constituent was fed to pigs for the purpose of fattening.

The following table shows a comparison of the average body weight over a period of 5 months of pigs given a diet of conventional feed, and pigs given a mixed feed composition containing the feed composition of the present invention in an amount of 15% with respect to the total weight.

TABLE 3

Comparison of Body Weights of Pigs

| | Body Weight (kg) | |
| --- | --- | --- |
| Date | Conventional Feed | Feed of Present Invention |
| Dec 11 | 64 | 67 |
| 18 | 66 | 69 |
| 25 | 68 | 70 |
| Jan 2 | 73 | 74 |
| 9 | 79 | 76 |
| 16 | 85 | 79 |
| 23 | 91 | 81 |
| 30 | 95 | 83 |
| Feb 6 | 98 | 87 |
| 13 | 102 | 89 |
| 16 | 102 | 93 |
| 20 | 103 | 96 |
| 22 | 105 | 99 |
| 27 | 105 | 104 |
| Mar 4 | 106 | 106 |
| 7 | 107 | 109 |
| 11 | 107 | 110 |
| 18 | 108 | 112 |
| 19 | 108 | 115 |
| 25 | 109 | 118 |
| Apr 1 | 110 | 119 |
| 8 | 111 | 122 |
| 9 | 111 | 126 |

TABLE 3-continued

Comparison of Body Weights of Pigs

| Date | Body Weight (kg) | |
|---|---|---|
| | Conventional Feed | Feed of Present Invention |
| 15 | 111 | 129 |
| 22 | 112 | 130 |
| 23 | 112 | 131 |
| 24 | | 131 |

Additionally, FIG. 1 shows the above-given data in the form of a line graph.

These results indicate that in comparison to the pigs which were fed the conventional feed, the pigs fed the feed composition according to the present invention exhibited more stable and fuller development.

Furthermore, in general, when the weight of a pig exceeds 100 kg, there tends to be a lot of fat, lowering the quality of the meat. However, the pigs fed the feed composition of the present invention had a lot of flesh and were of extremely good quality. The following table shows the results of an analysis of the meat quality.

TABLE 4

| Type of Feed | Market Weight (kg) | Fleshy Weight (kg) |
|---|---|---|
| Present Invention | 127–135 | 85–91 |
| Conventional Feed | 100–115 | 70–75 |

While the pigs used in the above example were of the Berkshire variety, the same effects can be obtained in other varieties of pigs as well.

In a similar manner, a livestock feed composition containing Aspergillus having swill as the main constituent was fed to chickens. While chickens given normal feed grew to an average of 4.5 kg in two months, those given the feed composition of the present invention attained an average of 6 kg over the same period of time, thus demonstrating its fattening effect. Furthermore, whereas fattened chickens normally collect a large amount of fat around the heart, this was not observed in those fattened on the feed composition of the present invention, these chickens being of very good quality with little fat.

The raw material used for the production of the feed composition in the present invention can be such as to use any one of the above-described materials alone, or in a mixture of a plurality of these materials. When using raw materials with low starch content such as fruit pulp, it is preferable to use them in a mixture with raw materials rich in starches such as wheat bran and rice bran. Additionally, with regard to the Aspergillus, any type including *Asp. oryzae, Asp. awamori* and *Asp. sojae* can be used.

In summary of the above test results, by mixing the livestock feed composition of the present invention with conventional livestock feed, it was possible to obtain the effects of:
(1) not causing ureterolithiasis even when adding the livestock feed composition of the present invention in an amount of up to 30% of the total amount of the feed composition;
(2) largely reducing the odor of manure;
(3) preventing diarrhea;
(4) preventing disorders of the digestive organs; and
(5) a 20% increase in growth rate due to the provision of the livestock feed composition of the present invention in an amount of at least 10%.

Example 5

Furthermore, the basic conditions for producing the livestock feed composition of the present invention were confirmed by means of experiments.

As the raw material for the culture, wheat bran (starch equivalent 53.4%) and cedar shavings (starch equivalent 0%) were used.

The wheat bran and cedar shavings were mixed together, water was added to each and the water content was adjusted to 42%. The proportion of wheat bran and cedar shavings in the mixture was set so that the overall starch equivalent after adjusting the water content was 35%, 30%, 25%, 20%, 15% and 10%.

Next, these were sterilized in an autoclave at 105° C. for 15 minutes.

After sterilizing the culture media and cooling to 42° C., 0.1 wt % of Aspergillus spores were well-mixed therein, the results were cooled to 32° C. and held inside a constant temperature tank set at 32° C. The time required for these to reach 45° C. due to the heat of fermentation of the Aspergillus was as given in the following table.

TABLE 5

| Starch Equivalent | 35% | 30% | 25% | 20% | 15% | 10% |
|---|---|---|---|---|---|---|
| Required Time | 12 | 12 | 12 | 12 | 18 | — |

As is clear from the above-given table, there is almost no heat from fermentation by the Aspergillus when the starch equivalent of the culture medium is less than 15%, thus indicating that the starch equivalent required for healthy fermentation is at least 15%. If the starch equivalent of the culture medium is at least 15%, the fermentation of the Aspergillus progresses and as a result heat is generated, this heat of fermentation being capable of being used to remove the moisture from the feed composition. Furthermore, it was found that similar effects could be obtained by using oils instead of starches, the value in this case being at least 5%.

These experimental results indicate that a livestock feed composition enabling long-term storage and having high functionality can be produced by fermenting a high-concentration organic waste material with the water content adjusted to 50% or less and the starch equivalent to at least 15%, then using the heat of fermentation to lower the water content to 20% or less.

Next, livestock feed compositions were produced according to various examples, and their production cost was computed.

Example 6

Production of Livestock Feed Composition from Swill
Swill: Water Content 75%, Starch Equivalent 35%
Wheat Bran: Water Content 13%, Starch Equivalent 53.4%
One ton of each was mixed together to make the water content 44% and the starch equivalent 44.2%.

This was steam-sterilized, then cooled to 40° C., and 1 kg of spores were added.

After 12 hours, the temperature rose to 45° C., so that ventilation was performed thereafter to maintain the temperature within a range of 35° C. to 50° C. for 60 hours. As a result, 1.24 tons of a dry feed composition capable of withstanding long-term storage with a water content of 16.2% and starch equivalent of 64.5% was obtained.

The amount of power needed was 72 kilowatts, 40 l of fuel. When calculating the operating costs assuming 11 yen per kilowatt and 50 yen per liter of fuel, 2,792 yen were required to produce 1.24 tons of livestock feed composition.

An accounting of the production costs is given below. All prices are given as figures per ton for ease of understanding.

| | |
|---|---|
| Wheat Bran Purchasing Price: | 20000 yen/ton |
| Swill Collecting Fee: | −10000 yen/ton |
| Operating Cost: | 2792 yen |
| Aspergillus: | 500 yen/kg |
| Produced Feed Weight: | 1.24 kg |

The production cost for 1.24 tons of a livestock feed composition produced in this way can be computed as follows:
Production Cost (per 1.24 tons)=Wheat Bran Purchasing Price (1 ton)−Swill Handling Fee+Operating Cost+Aspergillus Purchasing Price=20000−10000+2792+500=13292 yen
Production Cost (per ton)=13292/1.24=10719 yen This cost can be considered to be an extremely low cost which is substantially less than the average purchasing price, when considering that the average purchasing price of a livestock feed composition is from 20000 to 50000 yen.

Example 7

A livestock feed composition was further produced from the livestock feed composition produced in Example 6 and swill.
Fermented Swill: Starch Equivalent 64.5%, Water Content 16.2%
Swill: Starch Equivalent 35%, Water Content 75%

One ton of each was mixed together to make the water content 50% and the starch equivalent 45%.

This was fermented with 1 kg of Aspergillus by the same process as in Example 6, to obtain 1.2 tons of a livestock feed composition with a water content of 16.8% and starch equivalent of 75.3%.

The energy fees required for operation were about the same as in Example 6.

The production costs can be calculated as follows:
Production Cost (per 1.2 tons)=Fermented Swill Production Cost−Swill Handling Fee+Operating Cost+Aspergillus Purchasing Price=10719−10000+2792+500=4011 yen
Production Cost (per ton)=4011/1.2=3342 yen In Example 6, wheat bran (purchasing price 20000 yen per ton) were used as the materials for the culture medium, but in Example 7, the livestock feed composition (production cost 10719 yen per ton) was used instead of the wheat bran of Example 6 to mix with the swill, thus further reducing the production cost.

Example 8

A livestock feed composition was further produced from the livestock feed composition produced in Example 7 and swill.

Aside from the fact that the livestock feed composition produced in Example 7 was used, the energy fees required for operation were basically the same as in Examples 6 and 7.

In this case, the production cost can be calculated as follows.

Production Cost (per 1.2 tons)=Fermented Swill Production Cost−Swill Handling Fee+Operating Cost+Aspergillus Purchasing Price=3342−10000+2792+500=−3366 yen
Production Cost (per ton)=−3366/1.2=−2805 yen This result shows that a livestock feed composition can be obtained wherein a profit of 2805 is already gained simply by producing 1 ton of livestock feed, which means that the livestock feed composition does not have a production cost, but rather runs on a profit, which has heretofore been unthinkable.

Example 9

A livestock feed composition was produced in the same manner as Example 6, by adding 1 ton of wheat bran to 800 kg of apple juice residue.
Apple Juice Residue: Starch Equivalent 13%, Water Content 81.6%
Wheat Bran: Starch Equivalent 53.4%, Water Content 13%
Mixture: Starch Equivalent 35.4%, Water Content 43.4%

From this mixture, 1.1 tons of a livestock feed composition with a water content of 17.3% and a starch equivalent of 50% was produced. The energy costs required for this were roughly the same as in Example 6, at 2800 yen.

The fee for handling the apple juice residue was 10000 yen per ton. That is,
Production Cost=Wheat Bran Purchasing Price−Residue Handling Fee+Operating Cost+Aspergillus Purchasing Price=20000−10000+2800+500=13300 yen
Production Cost (per ton)=13300/1.1=12090 yen In this case also, a livestock feed composition was obtained at 12090 yen per ton which is considerably less than the price for purchasing wheat bran (20000 yen/ton).

Example 10

1 ton of fish dregs were used to produce a similar livestock feed composition.
Fish Dregs: Starch Equivalent 0%, Water Content 51%
Wheat Bran: Starch Equivalent 53.4%, Water Content 13%

1.6 tons of a livestock feed composition with a water content of 18.7% and a starch equivalent of 29.9% was produced from this mixture. The energy fees required for this procedure amounted to 2300 yen.

The fee for handling the fish dregs was 15000 yen per ton.
Production Cost=Wheat Bran Purchasing Price−Residue Handling Fee+Operating Cost+Aspergillus Purchasing Price=20000−15000+2800+500=7800 yen
Production Cost (per ton)=7800/1.6=4875 yen As is clear from the above-described examples 6 through 10, the fees for handling high-concentration organic waste which has been considered to be troublesome in the past can be used to produce an extremely cheap livestock feed composition which has not been conventionally known.

Compared to the conventional art, the production cost reducing effect of the present invention can be analyzed as follows.

First, with regard to feed production, most techniques for making feed out of high-concentration organic wastes used conventionally are such as to dry them physically. The cost can be approximated by computing the amount of thermal energy needed to evaporate away the moisture based on evaporative thermal conversion of the water contained in the waste. that is, the cost for drying swill with a water content of 70% is at least 10000 yen per ton considering only the energy fees. From 1 ton of swill, approximately 350 kg of dry feed can be produced. The energy fees are canceled by the fee of 10000 yen for handling the swill. That is, the sum of the material fees and processing fees (energy fees) required for producing 1 ton of feed becomes 0 yen, and the production cost for the resulting dry feed is 0 yen.

In contrast, according to the present technique as shown in Examples 2 and 3, the production costs are actually reduced at each production, and the production costs are negative. That is, a profit can be made even if the livestock feed composition is given away for free. Additionally, whereas the conventional art simply dries the swill, the feed composition according to the present invention has greater effects than conventional feeds, by improving the fattening effect of livestock. That is, the method of the present invention not only enables production of a fermented livestock feed composition at a cheaper price than conventional methods, but also offers a livestock feed composition which has a cheaper production cost than even common feed compositions which are not fermented.

On the other hand, while the production of fertilizers is known as another way of processing organic waste materials, the most common process for forming fertilizer is composting. The drawbacks of this method are (1) that a long period of at least 6 months is necessary to produce a completely fertile compost that does not cause nitrite-nitrogen contamination of the soil, (2) that the minerals which are contained therein are not decomposed and (3) that it is not applicable to waste materials that have a high water content. In contrast, the process for producing a livestock feed composition according to the present invention, due to the inclusion of minerals which are necessary for livestock, makes it unnecessary to separately supply the livestock with salts.

What is claimed is:

1. A method for producing a livestock feed composition comprising steps of combining an organic waste material with one or more materials selected from the group consisting of a fibrous material and a cereal material so that the resultant mixture has an oil content of at least 5%, then adding Aspergillus, and allowing said Aspergillus to incubate to form an Aspergillus-containing livestock feed composition.

2. A method for producing a livestock feed composition in accordance with claim 1, wherein said Aspergillus is selected from the group consisting of *Asp. oryzae, Asp. awamori* and *Asp. sojae.*

3. A method for producing a livestock feed composition in accordance with claim 1, wherein said Aspergillus is selected from the group consisting of *Asp. oryzae kawachii* and *Asp. awamori kawachii.*

4. A method for producing a livestock feed composition in accordance with claim 1, wherein said fibrous feed material comprises one or more materials selected from the group consisting of wheat bran, barley bran, rice bran, hay and beet pulp.

5. A method for producing a livestock feed composition in accordance with claim 1, wherein said cereal material comprises one or more materials selected from the group consisting of rice, barley, ground barley, wheat, oats, rye, soybeans and maize.

6. A method for producing a livestock feed composition in accordance with claim 1, wherein said organic waste material comprises one or more materials selected from the group consisting of food industry waste, livestock industry waste, fishing industry waste and waste from the household.

7. A method for producing a livestock feed composition in accordance with claim 1, wherein said organic waste material comprises one or more materials selected from the group consisting of fruit pulp, swill, molasses, fish dregs and fowl droppings.

8. A method for producing a livestock feed composition in accordance with claim 1, further comprising a step, after said incubating step, of adding one or more materials selected from the group consisting of a fibrous feed material, a cereal material and an organic waste.

9. A method for producing a livestock feed composition in accordance with claim 1, further comprising a step of adding to the Aspergillus-containing livestock feed composition one or more common feed materials selected from the group consisting of barley, rice, soybeans, maize, hay, molasses and beet pulp, such that the Aspergillus-containing livestock feed composition constitutes at least 5 wt % of the entire livestock feed composition.

10. A method for producing a livestock feed composition in accordance with claim 1, further comprising the step of adding one or more common feed materials selected from the group consisting of barley, rice, soybeans, maize, hay, molasses and beet pulp, such that the Aspergillus-containing livestock feed composition constitutes up to 30 wt % of the entire livestock feed composition.

11. A method for producing a livestock feed composition in accordance with claim 1, wherein said adding step comprises mixing an organic waste material with one or more materials selected from the group consisting of a fibrous feed material and a cereal material to obtain a mixture having a water content of 50% or less and an oil content of at least 5% and heat-sterilizing this mixture to form a culture medium, cooling said culture medium to a temperature compatible with Aspergillus and mixing Aspergillus into said culture medium; and said incubating step comprises maintaining the temperature of said culture medium and said Aspergillus in a constant temperature tank to allow fermentation until the water content is reduced to 20 wt % or less.

12. A method for producing a livestock feed composition in accordance with claim 1, wherein said adding step comprises mixing a heat-sterilized organic waste material with one or more materials chosen from the group consisting of a fibrous feed material and a cereal material to form a culture medium having a water content of 50% or less and an oil content of at least 5%, cooling said culture medium to a temperature compatible with Aspergillus and mixing Aspergillus into said culture medium; and said incubating step comprises maintaining the temperature of said culture medium and said Aspergillus in a constant temperature tank to allow fermentation until the water content is reduced to 20 wt % or less.

13. A method for producing a livestock feed composition in accordance with claim 11, wherein said heat-sterilization is performed by steam sterilization.

14. A method for producing a livestock feed composition in accordance with claim 12, wherein said heat-sterilization is performed by steam sterilization.

15. A method for producing a livestock feed composition in accordance with claim 11, wherein the temperature in maintained within the range of 35 to 50° C. for at least 24 hours.

16. A method for producing a livestock feed composition in accordance with claim 12, wherein the temperature in maintained within the range of 35 to 50° C. for at least 24 hours.

17. A method for producing a livestock feed composition in accordance with claim 11, further comprising a step of combining said Aspergillus-containing feed composition with an organic waste material.

18. A method for producing a livestock feed composition in accordance with claim 12, further comprising a step of combining said Aspergillus-containing feed composition with an organic waste material.

19. A livestock feed composition comprising an Aspergillus-containing feed composition obtained by adding Aspergillus to a mixture of an organic waste material and one or more materials selected from the group consisting of a fibrous feed material and a cereal material, the mixture having an oil content of at least 5%, and allowing the Aspergillus to incubate.

20. A livestock feed composition in accordance with claim 19, wherein said Aspergillus is selected from the group consisting of *Asp. oryzae, Asp. awamori* and *Asp. sojae*.

21. A livestock feed composition in accordance with claim 19, wherein said Aspergillus is selected from the group consisting of *Asp. oryzae kawachii* and *Asp. awamori kawachii*.

22. A livestock feed composition in accordance with claim 19, wherein said fibrous feed material comprises one or more materials selected from the group consisting of wheat bran, barley bran, rice bran, hay and beet pulp.

23. A livestock feed composition in accordance with claim 19, wherein said cereal material comprises one or more materials selected from the group consisting of rice, barley, ground barley, wheat, oats, rye, soybeans and maize.

24. A livestock feed composition in accordance with claim 19, wherein said organic waste material comprises one or more materials selected from the group consisting of food industry waste, livestock industry waste, fishing industry waste and waste from the household.

25. A livestock feed composition in accordance with claim 19, wherein said organic waste material comprises one or more materials selected from the group consisting of fruit pulp, swill, molasses, fish dregs and fowl droppings.

26. A livestock feed composition in accordance with claim 19, further comprising at least one or more common feed materials selected from the group consisting of barley, rice, soybeans, maize, hay, molasses and beet pulp.

27. A livestock feed composition in accordance with claim 26, wherein said Aspergillus-containing feed composition constitutes at least 5 wt % of the entire livestock feed composition.

28. A livestock feed composition in accordance with claim 26, wherein said Aspergillus-containing feed composition constitutes 30 wt % or less of the entire livestock feed composition.

29. A livestock feed composition in accordance with claim 19, wherein said Aspergillus-containing feed composition is obtained by mixing an organic waste material with one or more materials selected from the group consisting of a fibrous feed material and a cereal material to obtain a mixture having a water content of 50% or less and an oil content of at least 5% and heat-sterilizing this mixture to form a culture medium, cooling said culture medium to a temperature compatible with Aspergillus and mixing Aspergillus into said culture medium; and maintaining the temperature of said culture medium and said Aspergillus in a constant temperature tank to allow fermentation until the water content is reduced to 20 wt % or less.

30. A livestock feed composition in accordance with claim 19, wherein said Aspergillus-containing feed composition is obtained by mixing a heat-sterilized organic waste material with one or more materials selected from the group consisting of a fibrous feed material and a cereal material to form a culture medium having a water content of 50% or less and an oil content of at least 5%, cooling said culture medium to a temperature compatible with Aspergillus and mixing Aspergillus into said culture medium; and maintaining the temperature of said culture medium and said Aspergillus in a constant temperature tank to allow fermentation until the water content is reduced to 20 wt % or less.

31. A livestock feed composition in accordance with claim 29, wherein said heat-sterilization is performed by steam sterilization.

32. A livestock feed composition in accordance with claim 30, wherein said heat-sterilization is performed by steam sterilization.

33. A livestock feed composition in accordance with claim 29, wherein the temperature is maintained within the range of 35 to 50° C. for at least 24 hours.

34. A livestock feed composition in accordance with claim 30, wherein the temperature is maintained within the range of 35 to 50° C. for at least 24 hours.

35. A livestock feed composition in accordance with claim 29, further comprising a step of combining said Aspergillus-containing feed composition with an organic waste material.

36. A livestock feed composition in accordance with claim 30, further comprising a step of combining said Aspergillus-containing feed composition with an organic waste material.

* * * * *

UNITED STATES PATENT AND TRADEMARK OFFICE
CERTIFICATE OF CORRECTION

PATENT NO.    : 6,623,771 B2
DATED         : September 23, 2003
INVENTOR(S)   : Masahiro Yamamoto It is certified that error appears in the above-identified patent and that said Letters Patent is hereby corrected as shown below:

Column 7,
Line 7, please delete the column heading which reads "Normal Wheat Bran", and insert therefor -- Fermented Wheat Bran --.
Line 7, please delete the column heading which reads "Fermented Wheat Bran", and insert therefor -- Normal Wheat Bran --.

Signed and Sealed this

Second Day of March, 2004

JON W. DUDAS
*Acting Director of the United States Patent and Trademark Office*